US012556853B2

(12) United States Patent
Liang et al.

(10) Patent No.: US 12,556,853 B2
(45) Date of Patent: Feb. 17, 2026

(54) 2 POGO PIN DESIGN FOR TWS HEADPHONE

(71) Applicant: HARMAN INTERNATIONAL INDUSTRIES, INCORPORATED, Stamford, CT (US)

(72) Inventors: Tieyi Liang, Guangdong (CN); Daeim Han, Guangdong (CN); Bin Cai, Guangdong (CN)

(73) Assignee: Harman International Industries, Incorporated, Stamford, CT (US)

( * ) Notice: Subject to any disclaimer, the term of this patent is extended or adjusted under 35 U.S.C. 154(b) by 622 days.

(21) Appl. No.: 17/928,132

(22) PCT Filed: Jun. 1, 2020

(86) PCT No.: PCT/CN2020/093718

§ 371 (c)(1),
(2) Date: Nov. 28, 2022

(87) PCT Pub. No.: WO2021/243509

PCT Pub. Date: Dec. 9, 2021

(65) Prior Publication Data

US 2023/0224621 A1 Jul. 13, 2023

(51) Int. Cl.
*H01M 10/46* (2006.01)
*G01R 1/067* (2006.01)
(Continued)

(52) U.S. Cl.
CPC ....... *H04R 1/1025* (2013.01); *G01R 1/06722* (2013.01); *G01R 19/155* (2013.01); *H02J 7/0044* (2013.01); *H02J 7/0047* (2013.01)

(58) Field of Classification Search
CPC ...... H02J 7/0044; H02J 7/0063; H02J 7/0047; H02J 7/0042; G01R 19/155; G01R 1/06722; H04R 1/1025
(Continued)

(56) References Cited

U.S. PATENT DOCUMENTS

2008/0057858 A1* 3/2008 Smith .................. H04R 1/1033 455/3.05
2009/0197156 A1 8/2009 Goto
(Continued)

FOREIGN PATENT DOCUMENTS

CN 206349540 U 7/2017
CN 108924691 A 11/2018
(Continued)

OTHER PUBLICATIONS

Chinese Office Action for CN Application No. 202080101638.8 filed Dec. 1, 2022, dated Oct. 1, 2024, 7 pages.
(Continued)

*Primary Examiner* — Edward Tso
(74) *Attorney, Agent, or Firm* — Brooks Kushman, P.C.

(57) ABSTRACT

A True Wireless System (TWS) headphone is provided, which comprises a charging case and one or two earbuds. The earbuds may be attached into the charging case by a two pogo pin connector. The earbuds can detect the different status of the battery in the charging case via the two pogo pin connector and can auto power on or off accordingly when taken out or put into the charging case.

20 Claims, 3 Drawing Sheets

(51) Int. Cl.

| | |
|---|---|
| ***G01R 19/155*** | (2006.01) |
| ***H02J 7/00*** | (2006.01) |
| ***H04R 1/1025*** | (2026.01) |

(58) Field of Classification Search

USPC ......................... 320/107, 114, 115, 128, 137

See application file for complete search history.

(56) References Cited

U.S. PATENT DOCUMENTS

| | | | |
|---|---|---|---|
| 2010/0083012 | A1 | 4/2010 | Corbridge et al. |
| 2016/0190840 | A1 | 6/2016 | Rich et al. |
| 2020/0036198 | A1 * | 1/2020 | Kim ..................... H05K 5/0086 |
| 2020/0274502 | A1 * | 8/2020 | Steinberg ................. H04R 3/00 |

FOREIGN PATENT DOCUMENTS

| | | | | |
|---|---|---|---|---|
| CN | 109756808 | A | 5/2019 | |
| CN | 110139183 | A | 8/2019 | |
| CN | 209419249 | U | 9/2019 | |
| CN | 110572736 | A | 12/2019 | |
| CN | 110611348 | A * | 12/2019 | ........... H04R 1/1025 |
| CN | 110690742 | A | 1/2020 | |
| CN | 110996207 | A | 4/2020 | |
| CN | 210536885 | U | 5/2020 | |
| CN | 110572736 | B * | 5/2021 | ........... H04R 1/1041 |
| EP | 3567694 | B1 | 8/2022 | |
| JP | 2020039243 | A | 3/2020 | |
| TW | 201440537 | A | 10/2014 | |

OTHER PUBLICATIONS

Extended European Search Report dated Mar. 7, 2024 for European Patent Application No. 20938827.1, 10 pages.

International Search Report dated Mar. 21, 2021 for PCT Appn. No. PCT/CN2020/093718 filed Jun. 1, 2020, 9 pgs.

Japanese Office Action for JP Application No. 2022-570131 filed Nov. 16, 2022, dated May 31, 2024, 5 pages.

* cited by examiner

2 POGO PIN DESIGN FOR TWS HEADPHONE

CROSS-REFERENCE TO RELATED APPLICATION

This application is the U.S. national phase of PCT Application No. PCT/CN2020/093718 filed on Jun. 1, 2020; the disclosure of which is hereby incorporated in its entirety by reference herein.

TECHNICAL FIELD

Aspects disclosed herein generally relate to a True Wireless System (TWS) headphone technology. More particularly, the disclosed aspects relate to a TWS headphone with a 2 pogo pin connector and a method thereof for detecting a status of a battery and earbuds.

BACKGROUND

The latest trend in wireless headphones is True Wireless Stereo system (TWS), which comprises one or two independent earbuds that are charged in their specific charging case. The charging case may supply power to the earbuds for charging typically through pogo pin connectors. TWS headphones do not need wired connection, completely abandon the way of connecting through wires, and realize single and double ear wearing. The two left and right earbud pairs form a stereo system through a wireless connection, so the audio playback, call, and wearing experience are all improved. Therefore, TWS headphones are more and more popular and welcomed by the general users.

In the current TWS market, there are different types of pogo pin connectors, such as 2 pogo pin connectors and 3 pogo pin connectors. The traditional 2 pogo pin connector for the TWS headphone has limitation in that earbuds of the TWS headphone cannot automatically power on or power off when taken out from or inserted into the charging case in case of the charging case battery exhausted, which may lead to extra power consummation and a decrease in user experience. The mentioned function may be achieved using a 3 pogo pin design for the TWS headphone, which however is unaesthetic, and its extra pogo pin needs connecting to such as a Bluetooth chipset, that will cause ESD risk and charging INT issues.

Therefore, there may be a need to design a 2 pogo pin TWS headphone with its earbuds can automatically power on or off when the charging case power exhausted.

SUMMARY

The present disclosure overcomes some of the drawbacks by providing a TWS headphone with 2 pogo pin connector.

The TWS headphone provided herein comprises a charging case and at least one earbud, usually comprises a pair of earbuds. The earbuds can be attached to the charging case by jointing of the 2 pogo pin connector.

The charging case of the TWS headphone comprises a first pin and a second pin, a battery for providing a battery voltage, and a charging case charge IC for providing an output voltage. The charging case charge IC further comprises a first resistor and a third transistor, and the first resistor and the third transistor are connected in series between the first pin and the second pin.

The earbud of the TWS headphone comprises a first opposite pin and a second opposite pin, which are the opposite pins of the first and second pins, respectively. The first and first opposite pins, as well as the second and the second opposite pins, can be attached with each other when the 2 pogo pin connecter joint. The earbud further comprises a voltage detection IC for detecting the output voltage on the first pin and an add voltage detection IC for detecting an add voltage on the first opposite pin when the earbud is in the charging case. In particular, the add voltage detection IC comprises a fourth transistor, its source electrode is provided with a positive supply power voltage, its gate electrode is isolated from its source electrode by a second resistor and is connected to the first opposite pin via an anti-reverse diode, and its drain electrode is connected to a third resistor and then the third resistor is connected to the ground.

A method for using the TWS headphone with 2 pogo pin connector is also provided herein. The method comprises the following steps of: attaching the earbud of the TWS headphone into a charging case of the TWS headphone via the 2 pogo pin connector; detecting via a voltage detection IC in the earbud an output voltage provided by a charging case charge IC of the charging case on a first pin of the charging case; and detecting via an add voltage detection IC in the earbud an add voltage on a first opposite pin of the earbud.

The first and second pins form one side of the 2 pogo pin connector, and the first opposite and second opposite pins form the opposite side of the 2 pogo pin connector. When the earbud is attaching in the charging case, the first pin is connected to the first opposite pin, and the second pin is connected of the second opposite pin.

Therefore, the earbuds of the TWS headphone as provided in the disclosure can determine the battery power status and the earbud in or out of the charging case by detecting the output voltage and the add voltage using only one 2 pogo pin connector and accordingly automatically power on or power off the earbud.

BRIEF DESCRIPTION OF THE DRAWINGS

The present disclosure may be better understood from reading the following description of non-limiting embodiments, with reference to the attached drawings. In the figures, like reference numeral designates corresponding parts, wherein.

DETAILED DESCRIPTION

The detailed description of the embodiments is disclosed hereinafter; however, it is understood that the disclosed embodiments are merely exemplary and that such embodiments may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
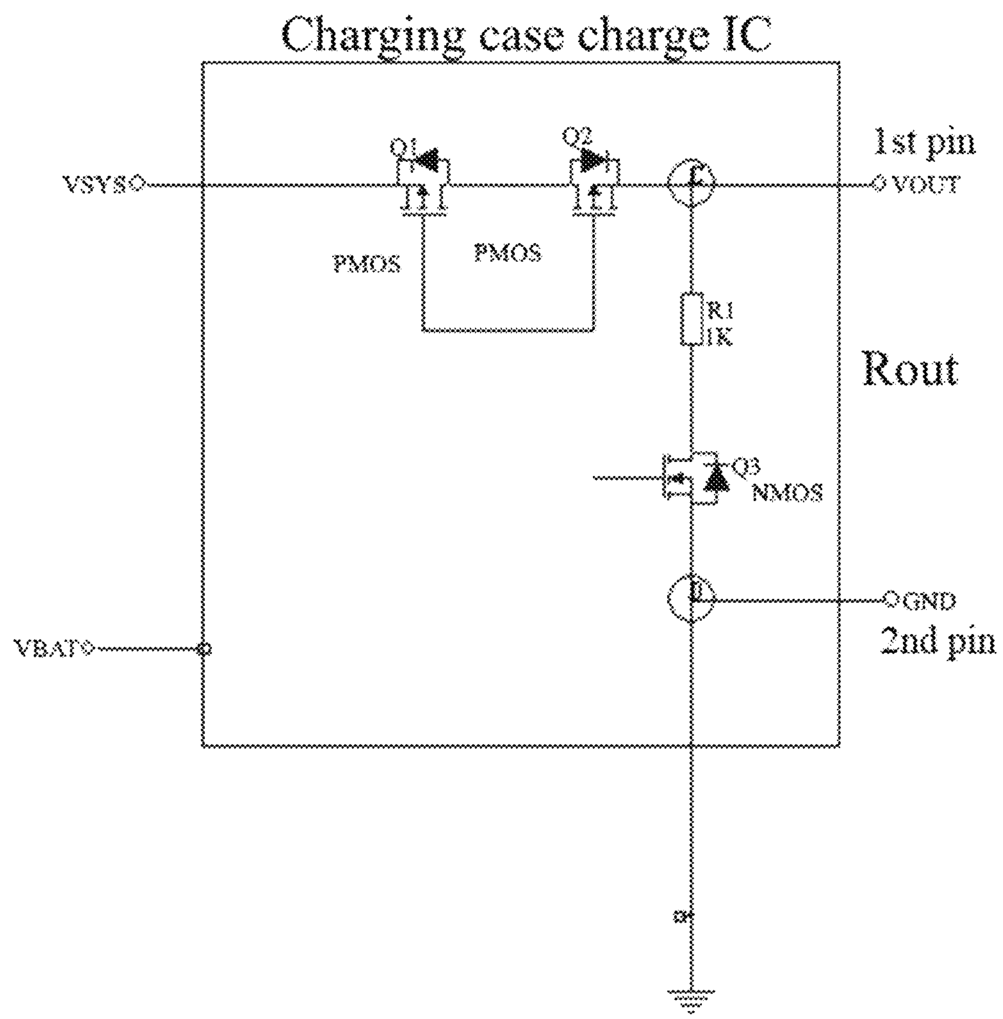
FIG. 1 is a schematic circuit diagram illustrating the charging case charge IC of the TWS headphone according to one embodiment.

Referring to FIG. 1, the schematic circuit diagram of the charging case charge IC of the TWS headphone according to one embodiment is shown. A battery arranged in the charging case is connected to the charging case charge IC for providing a battery voltage VBAT. The battery supplying a voltage VBAT>3 V, such as 3 V~4.2 V, can supply power in normal to the output of the charging case for charging. In this case, the provided battery voltage VBAT may be increased through such as a booster circuit (not shown) to generate a system voltage VSYS of for example 5 V. Then, the system voltage VSYS=5 V can firstly go through an anti-reverse protection switch and then be supplied to the power output of the charging case charge IC. The anti-reverse protection switch is formed with a first transistor Q1 and a second transistor Q2 back-connected between point C and point D of the charging case charge IC. The first transistor Q1 and The second transistor Q2 are both the PMOS transistor. The power output of the charging case charge IC is in form of one side of 2 pogo pin connector with a first pin led out from the point C and a second pin led out from the point D, and the point D is GND. Reference to "pogo pin" throughout refers to generic spring-loaded contacts, though may include specific examples of POGO® pins or the like. Therefore, the output voltage VOUT on the first pin is 5 V, i.e., VOUT=5 V when the charging case battery supplies power in normal. The second pin is GND.

As to the power output of the charging case charge IC, a first resistor R1 and a third transistor Q3 are connected in series between point C and point D as shown in FIG. 1. The third transistor Q3 can be a NMOS transistor for example. Its drain electrode is connected to the first pull-up resistor R1, and its source electrode is GND. The third transistor Q3, as well as the first and second transistors Q1, Q2, may be controlled by a register in the charging case charge IC or in such as a microcontroller unit (MCU, not shown) arranged in the charging case. In this way, in case of the charging case is in low power mode, i.e., the battery voltage VBAT is lower than for example 3V, if VBAT is 2.8V~3V, the third transistor Q3 can be set on or off by the register. In one example, if the register set to 0, the third transistor Q3 is off, and if the register set to 1, the third transistor Q3 then is on. On the other hand, if the battery power is exhausted, i.e., VBAT<2.8V, a battery protection IC will disable the battery voltage to be 0V. At this time, the third transistor Q3 is on if there is an add voltage greater than for example 0.5V at the first pogo pin, which may come from the external earbud attached in the charging case. The output impedance Rout is now equivalent to the first resistor R1.

Figure 2:
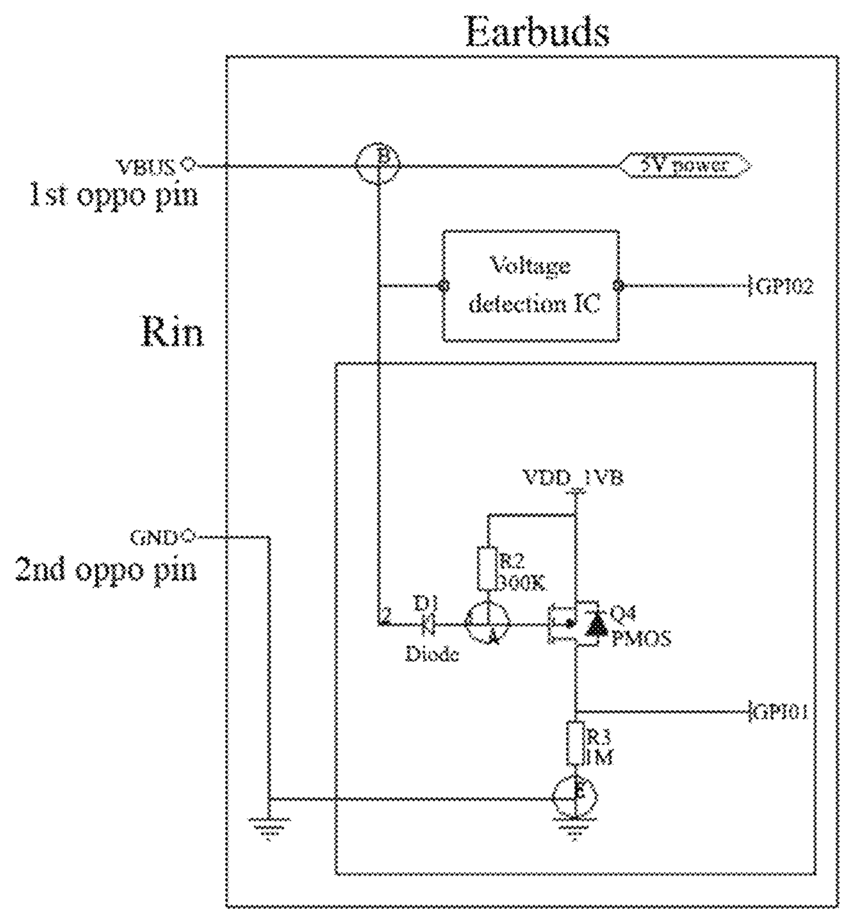
FIG. 2 is a schematic circuit diagram illustrating the earbuds of the TWS headphone according to one embodiment.

Referring to FIG. 2, the schematic circuit diagram of the earbud of TWS headphone according to one embodiment is shown. The earbud comprises a power input in form of an opposite side of 2 pogo pin connector with a first opposite pin and a second opposite pin. The first opposite pin leading out from at point B has a bus voltage VBUS, and the second opposite pin leading out at point E is GND. An add voltage detection IC is connected between the point B and the point E in the earbud as shown in FIG. 2. The add voltage detection IC mainly comprises a fourth transistor Q4. The fourth transistor Q4 can be a PMOS transistor. Its gate electrode is connected to the point B via an anti-reverse diode D1, and its source electrode is provided with a positive supply voltage VDD_1V8 of for example 1.8 V The source electrode of the fourth transistor Q4 is isolated from its gate electrode via a second resistor R2 of for example 300 K Ohm. The drain electrode of the fourth transistor Q4 is connected to a third resistor R3 of for example 1 M Ohm, and to GND hereinafter at the point E. The drain electrode of the fourth transistor Q4 further leads out a pin GPIO 1 (general purpose input/output) port, which thus reflects the status of the voltage VBUS at point B on the first opposite pin.

As shown in FIG. 2, the earbud further comprises a voltage detection IC which detects the output voltage VOUT of the charging case, and leads out a pin GPIO 2 to reflect its status. When VOUT=5V, GPIO 2 reflects to be 1; and when VOUT≠5V, GPIO 2 reflects to be 0.

Figure 3:
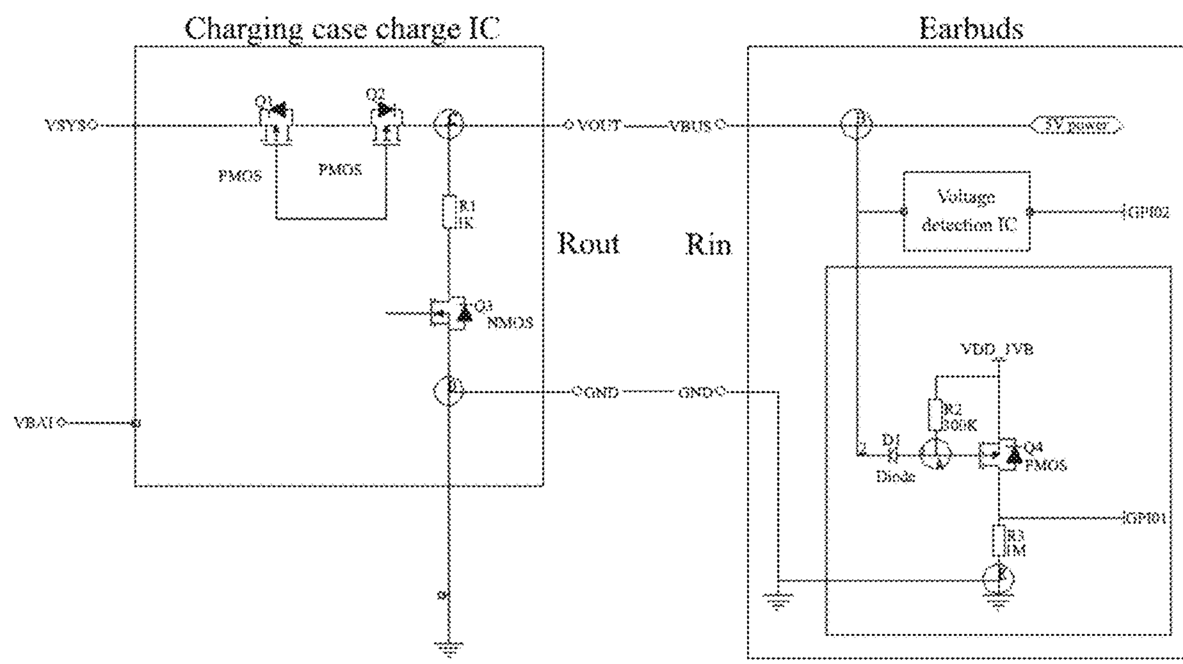
FIG. 3 is a schematic circuit diagram illustrating the charging case charge IC of FIG. 1 and the earbuds of FIG. 2 when connecting with each other for charging according to one embodiment

Referring to FIG. 3, the earbuds is connected in the charging case via the 2 pogo pin connector with the first pin attaching with the first opposite pin and the second pin attaching with the second opposite pin, respectively. It is conceivable by those skilled in the art, the pair of first and the second pins can be set as the male pins of one side of the 2 pogo pin connector, while the opposite pair of first opposite and second opposite pins can be set as the female pins of the opposite side of the 2 pogo pin connector, and vice versa, the 2 pogo pin connector may otherwise has a pair of female first and second pins, and a pair of male first opposite and second opposite pins.

In case of the charging case is in low power mode where the battery supplies under voltage, e.g., VBAT=2.8V~3V, the third transistor Q3 is on by such as setting the register to be 1, and the output resistor of the charging IC Rout is then equivalent to the first resistor R1 of for example 1K Ohm. On the other hand, in case of the charging case batter power is lower than 2.8V, the charging case battery protection IC will work and shut down the battery, i.e., VBAT=0V. Considering the positive supply power voltage VDD_1V8 is for example 1.8V, the add voltage at the point B is about 0.8V after pulled down by the second resistor R2 and then at the point A passed through the first diode D1, and thus on the first pin exists the add voltage VOUT=0.8V. Based on the charging case charge IC characters as described previously, the third transistor Q3 is on, and the output resistor Rout equals to the first resistor R1, i.e., Rout=R1=1K Ohm.

From the above analysis, it can be concluded that when the charging case battery is below the voltage sufficient for normal power supply, the output resistor of the charging IC Rout is always equivalent to R1, and the fourth transistor Q4 is always on, and GPIO 1 reflects as high.

However, if the 2 pogo pins does not form a loop with the first resistor and the third transistor Q3, which entails that the earbuds are out of the charging case, GPIO 1 reflects as low.

At this stage, the status detecting process of the TWS headphone of the present disclosure can be described as follows:

In the case of the battery in the charging case is sufficient, such as VBAT=3V-4.2V, to supply power on the power output VOUT in normal, i.e., VOUT=5V, if the earbuds is not fully charged or just put into the charging case, the voltage detection IC in the earbuds can detect that the charging case VOUT of 5V exists or not, and GPIO 2 reflects to be 0 or 1 to judge the status of earbud is in or out of charging case, respectively. If the earbud is fully charged and is connected in the charging case, the charging case power output VOUT equals to the battery voltage of the charging case VBAT, the earbuds voltage detection IC can detect that the battery voltage VBAT exists or not, and GPIO 2 reflects to be 0 or 1 to judge the status of earbud is in or out of charging case, respectively.

In the case of the battery in the charging case is below the voltage for charging, i.e., VBAT<3V, because the third transistor Q3 in the charging case is on, no matter the earbuds is in or out of charging case, the GPIO 2 is always low and reflects to be 0. The GPIO 1 reflects to be 1 if the earbud is in the charging case, and the GPIO 1 reflects to be 0 if the earbud is out of the charging case.

Accordingly, GPIO 1 and GPIO 2 reflecting to the charging case battery voltage and the earbud status can be included in the following table:

Therefore, the following status table includes the relationships among GPIO 1, GPIO 2, the charging case battery voltage, and the earbuds status:

| Charging case battery voltage | GPIO1 | GPIO2 | Earbuds status |
|---|---|---|---|
| Under voltage(<3 V) | 0 | 0 | Out of charging case |
| | 1 | 0 | In charging case |
| Normal voltage(3 V-4.2 V) | 0 | 0 | Out of charging case |
| | 0 | 1 | In charging case |

Given that the present disclosure provides a TWS headphone with 2 pogo pin connector to realize the automatic switching operation, it is noticeable that the earbuds of the TWS headphone may detect itself in or out of the charging case as well as the charging case battery voltage with the 2 pogo pin connector. According to the above listed table, when the earbuds is in the charging status, and if the battery power in the charging case is low or has been exhausted, the earbuds can automatically shut down or turn into a sleeping mode to save power consumption. If the battery power is sufficient for charging, the earbuds can be charged by the battery in the charging case. Therefore, the TWS headphone with 2 pogo pin design provided by the present disclosure may realize automatic switching on and off and saves power consumption.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

The invention claimed is:

1. A True Wireless System (TWS) headphone with a two pin connector, comprising:

a charging case comprising:

a first pin and a second pin;

a battery providing a battery voltage;

a charging case charge integrated circuit (IC) providing an output voltage on the first pin, wherein the charging case charge IC further comprises a first transistor and a first resistor, the first transistor and the first resistor are connected in series between the first pin and the second pin; and at least one earbud comprising:

a first opposite pin and a second opposite pin;

a voltage detection IC detecting a presence of the output voltage on the first opposite pin; and an add voltage detection IC detecting the presence of an add voltage on the first pin.

2. The TWS headphone of claim 1, wherein the add voltage detection IC comprises a first transistor including a source electrode of the forth transistor is provided with a positive supply power voltage, wherein a gate electrode of the first transistor of the add voltage detection IC is isolated from a source electrode thereof by a second resistor and is connected to the first opposite pin via an anti-reverse diode, and wherein a drain electrode of the first transistor of the add voltage detection IC is connected to a third resistor, and wherein the third resistor is connected to a ground.

3. The TWS headphone of claim 2, wherein the drain electrode of the first transistor of the add voltage detection IC leads out a first GPIO (general purpose input/output), and the voltage detection IC further leads out a second GPIO, the first GPIO and the second GPIO together reflect status of the at least one earbud and the battery voltage.

4. The TWS headphone of claim 3, wherein the status of the at least one earbud comprises one of an in charging case status and an out of charging case status.

5. The TWS headphone of claim 3, wherein the status of the battery voltage comprises a normal voltage and an under voltage.

6. The TWS headphone of claim 1, wherein the first pin and the second pin are male pins of the two pin connector, and the first opposite pin and the second opposite pin are female pins of the two pin connector.

7. The TWS headphone of claim 1, wherein the first pin and the second pin are female pins of the two pin connector, and the first opposite pin and the second opposite pin are male pins of the two pin connector.

8. The TWS headphone of claim 1, wherein the at least one earbud is jointed in the charging case by attaching the first pin to the first opposite pin and attaching the second pin to the second opposite pin.

9. The TWS headphone of claim 1, wherein the charging case charge IC further comprises a register, and the first transistor is set on or off by the register.

10. The TWS headphone of claim 1, wherein the charging case further comprises a microcontroller unit with a register, the first transistor is set on or off by the register.

11. A method for True Wireless System (TWS) headphone with a two pin connector, the method comprising:

attaching at least one earbud of the TWS headphone into a charging case of the TWS headphone via the two pin connector;

detecting, via a voltage detection integrated circuit (IC) in the earbud, an output voltage provided by a charging case charge IC of the charging case on a first opposite pin of the at least one earbud;

detecting, via an add voltage detection IC in the at least one earbud, an add voltage on a first pin of the charging case;

wherein the charging case charge IC further comprises a first resistor and a first transistor connected in series between the first pin and a second pin of the charging case; and wherein, the charging case further comprises a battery for providing a battery voltage, the method further comprises determining status of the at least one earbud and the battery voltage by the detected output voltage and the detected add voltage.

12. The method of claim 11, wherein the add voltage detection IC comprises a first transistor including a source electrode of the first transistor is provided with a positive supply power voltage, wherein a gate electrode of the first transistor of the add voltage detection IC is isolated from a source electrode thereof by a second resistor and is connected to the first opposite pin via an anti-reverse diode, and wherein a drain electrode of the first transistor is connected to a third resistor, and wherein the third resistor is connected to a ground.

13. The method of claim 12, wherein the drain electrode of the first transistor leads out a first GPIO, and the voltage detection IC further leads out a second GPIO, the first GPIO and the second GPIO reflect status of the at least one earbud and a battery voltage.

14. The method of claim 12, wherein the status of the at least one earbud comprises one of an in charging case status and an out of charging case status.

15. The method of claim 12, wherein the status of the battery voltage comprises a normal voltage and an under voltage.

16. The method of claim 11, wherein the first pin and the second pin are male pins of the two pin connector, and the first opposite pin and a second opposite pin are female pins of the two pin connector.

17. The method of claim 11, wherein the first pin and the second pin are female pins of the two pin connector, and the first opposite pin and a second opposite pin are male pins of the two pin connector.

18. The method of claim 11, wherein the at least one earbud is jointed in the charging case by attaching the first pin to the first opposite pin and attaching the second pin to a second opposite pin.

19. The method of claim 11, wherein the charging case charge IC further comprises a register, and the first transistor is set on or off by the register.

20. The method of claim 11, wherein the charging case further comprises a microcontroller unit with a register, the first transistor is set on or off by the register.

* * * * *